Figure 1:
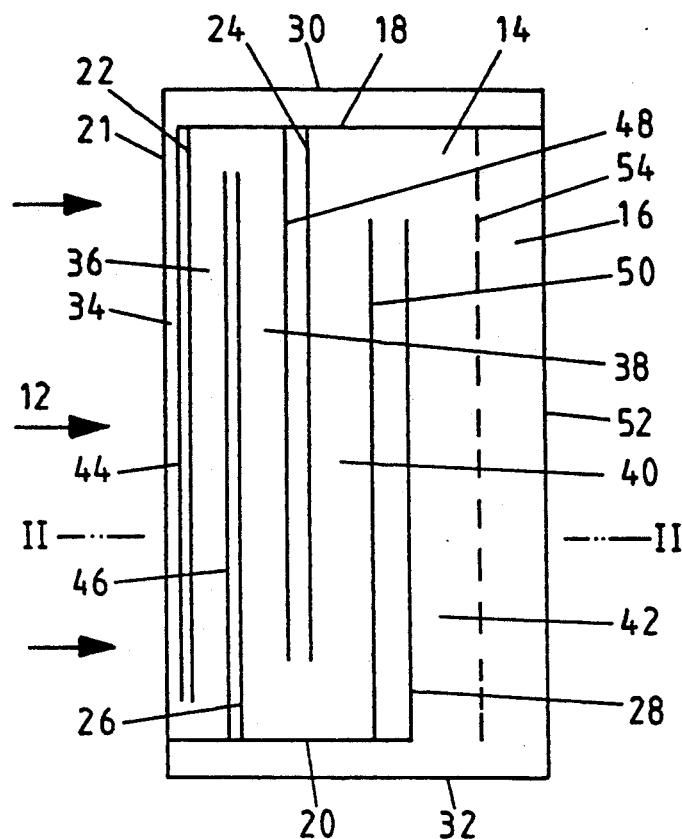

United States Patent [19]

Hohenstatt et al.

[11] Patent Number: 5,195,367
[45] Date of Patent: Mar. 23, 1993

[54] ANEMOMETER

[75] Inventors: Martin Hohenstatt, Hammersbach; Dieter Link, Hanau; Karlheinz Eckert, Gründau; Otakar Prokopec, Hanau, all of Fed. Rep. of Germany

[73] Assignee: Sensycon, Hanover, Fed. Rep. of Germany

[21] Appl. No.: 725,756

[22] Filed: Jun. 24, 1991

[30] Foreign Application Priority Data

Jun. 22, 1990 [DE] Fed. Rep. of Germany ....... 4019875

[51] Int. Cl.$^5$ ............................................... G01F 1/68
[52] U.S. Cl. ................................................. 73/204.26
[58] Field of Search ...................... 73/118.2, 204.26; 338/308, 25

[56] References Cited

U.S. PATENT DOCUMENTS

| 4,429,298 | 1/1984 | Oberholzer . | |
| 4,449,402 | 5/1984 | Eiermann et al. | 73/204.26 |
| 4,891,978 | 1/1990 | Sumal . | |
| 4,936,145 | 6/1990 | Hohenstatt | 73/204.26 |
| 5,038,610 | 8/1991 | Diehl et al. | 73/204.26 |

FOREIGN PATENT DOCUMENTS

| 100825 | 12/1972 | Fed. Rep. of Germany . |
| 3127081 | 1/1983 | Fed. Rep. of Germany . |
| 3223930 | 3/1988 | Fed. Rep. of Germany . |
| 3823642 | 3/1989 | Fed. Rep. of Germany . |

OTHER PUBLICATIONS

Donald G. Fink, et al. "Electronics Engineers' Handbook", 2nd Edition, 1975 (1982) McGraw Hill, New York pp. 7-78-7-79.

Primary Examiner—Herbert Goldstein
Attorney, Agent, or Firm—Cushman, Darby & Cushman

[57] ABSTRACT

An anemometer having a surface resistor disposed on a substrate and having a meander shaped current path imprinted into it. To permit presetting of the resistance value of the current path, resistance trimming lines are disposed parallel to the partition lines that limit the current path.

7 Claims, 1 Drawing Sheet

ANEMOMETER

The invention relates to an anemometer for flow speed or mass flow measurement of gases or fluids, in particular for determination of an air quantity aspirated through a passage of an internal combustion engine, having a surface resistor disposed on an electrically insulating carrier and provided—for formation of a preferably meander-shaped current path—with parallel first and second partition lines that extend from base lines running preferably in the direction of the flow or of the mass flow, where the width of current path sections limited by partition lines and substantially vertical to the direction of the flow or of the mass flow varies, with the widths of the current path sections in particular being dimensioned such that the electrical heating capacity density in each current path section decreases in or largely in the same measure as the local heat current density dissipated by the flow speed or mass flow while the distance of the current path section increases in the direction of the flow.

A corresponding anemometer is shown in German patent DE-A-31 27 081. By varying the width of subsequent current path sections, i.e. increasing the width from current path section to current path section from the leading edge in the flow direction, a considerable shortening of the response time of the anemometer is achieved regardless of the flow speed or mass flow to be measured.

The resistances of corresponding anemometers can vary for manufacturing reasons. In spite of these divergences, however, the anemometers should have certain resistance values at certain temperatures. For example, it is often required that at a temperature of 0° C., the resistor preferably designed as a thin-layer or film resistor has a value of 9 Ω. Known measures to achieve an appropriate increase in the resistance provide for a reduction of the current path at certain points, for example, whereby the overall resistance has the required value but at the same time an undergoes an undesirable temperature increase in the vicinity of the current path constriction. This in turn means that the required uniform temperature conditions over the surface resistor do not prevail, as a result of which the short response time required is not feasible.

The object of the present invention is to further develop an anemometer of the type described at the outset such that the resistance value of the resistor, designed preferably as a thin-layer or film resistor and disposed on the surface carrier, can be increased without any change to the temperature distribution over the resistor.

The object is attained in accordance with the invention substantially by resistance trimming lines parallel to the partition lines and extending from the latter's base lines being so disposed that the effective resistance of each current path section having a resistance trimming line is increased in percentage to the same extent. In other words, the electrical resistance of each current path section is increased in percentage to the same extent to which parallel lines are cut, for example by lasers, to the existing partition lines. Consequently, the electrical heating capacity density in each current path section continues to decrease in or largely in the same measure as the local heat current density dissipated by the flow speed or mass flow while the distance of the current path section increases in the direction of the flow.

The trimming lines extend of course from the base lines, from which the respective partition lines also extend.

Accordingly, dead resistor material paths are generated by the parallel cuts, through which the overall resistance of the surface resistor is increased to the required extent.

Consequently, it is possible with simple measures to trim the resistance in the resistor material to the required extent without relinquishing the advantages possible with an anemometer in accordance with DE-A-31 27 081.

The length of the resistance trimming line and that of the partition line are preferably identical or substantially identical.

According to a further proposal, the distance from the resistance trimming line to the partition line can be such that the resistance value of each current path section is increased up to a maximum of 20%.

Although the resistance trimming line is as a general principle at a distance from the partition line, this is not a cogent feature. It is preferable for the resistance trimming line to run in relation to the partition line in such a way that the latter is widened.

The resistance trimming lines run in accordance with the invention on the leading edge side in front of the respective partition lines. For this reason, the base line connected to the first trimming line must be lengthened on the leading edge side so that the resistance trimming line can be connected to it.

Between the last partition line on the trailing edge side and the longitudinal edge of the resistor material on the trailing edge side, there is—as a general principle—no resistance trimming line. If required, however, it can be provided in a further embodiment of the invention for a resistance trimming line to be allocated to the longitudinal edge of the surface resistor on the trailing edge side too.

Further details, advantages and features of the invention can be found not only in the claims and the features stated therein—singly and/or in combination, but also in the following description of a preferred embodiment as shown in the drawing.

Figure 2:
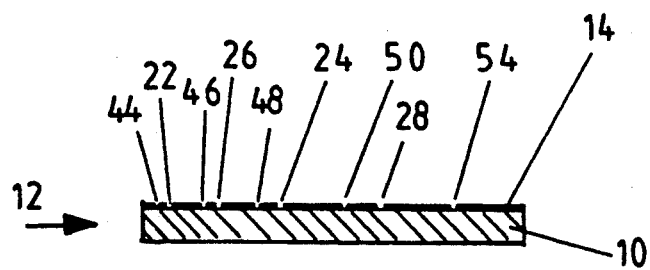

In the drawings,

FIG. 1 shows a plan view onto a surface resistor of an anemometer disposed on a carrier, and FIG. 2 shows a section along the line II—II in FIG. 1.

In the figures, a resistor material (14) deposited substantially over the entire surface is disposed on a surface-type carrier element (10) comprising electrically insulating material that is disposed in the direction of the flow to be measured (arrow (12)) of a fluid, such as aspirated air from internal combustion engines in particular. The resistor material (14) can be for example sputter-deposited platinum, in order to build up in this way a thin-layer resistor on the substrate carrier (10).

With etching techniques or separation by laser beams, for example, a meander-shaped current path (16) is imprinted. To this current path lead partition lines (22), (24) and (26), (28) extending from base lines (18) and (20) respectively that are parallel to the flow direction. The area of resistor material between the base lines (18) and (20) and the side edges (30) and (32) is then incorporated by connections, not shown, into a bridge circuit, for example, in order to thereby determine by means of known measuring apparatus the change in the resistance value of the surface resistor (16) and hence the speed of the fluid passing over the resistor.

As the plan view according to FIG. 1 makes clear, the meander-shaped current path (16) is designed asymmetrical in relation to the width of the various current path sections (34), (36), (38), (40) and (42). The width of the individual current path sections (34), (36), (38), (40) and (42) increases noticeably from the leading edge (21). The result is that the electrical heating capacity density in each current path section decreases in or largely in the same measure as the local heat current density dissipated by the flow speed or mass flow while the distance of the current path section increases in the direction of the flow. This permits the temperature of the entire thin-layer resistor (14) to be kept constant regardless of the flow speed or mass flow. In consequence, short response times are achieved.

For manufacturing reasons, the thin-layer resistors have as a general principle a lower resistance value than required. To permit trimming, i.e. increasing, of the resistance value without detriment to the previously characterized temperature behaviour of the resistor material (14), the invention provides for resistance trimming lines (44), (46), (48) and (50) to be disposed parallel to the partition lines (22), (24), (26) and (28) determining the meander shape and to extend from the base lines (18) and (20) with which the allocated partition lines (22), (24), (26) and (28) are also connected.

The distances between the resistance trimming lines (44), (46), (48) and (50) and the allocated partition lines (22), (24), (26) and (28) vary such that the resistance value of each current path section (34), (36), (38) and (40) is increased in percentage to the same extent. As a result, the electrical heating capacity density in each current path section continues to decrease in or largely in the same measure as the local heat current density dissipated by the flow speed or mass flow while the distance of the current path section increases in the direction of the flow, i.e. from the leading edge (21).

The length of each resistance trimming line (44), (46), (48) and (50) is preferably equal to the length of the allocated partition line (22), (24), (26), (28). In addition, a further resistance trimming line (54) shown as a dashed line in FIG. 1 can if necessary run parallel to the downstream longitudinal edge (52), with which line the resistance value of the current path section (42) is increased in percentage corresponding to that of the current paths (34), (36), (38) and (40).

The resistance trimming lines (44), (46), (48), (50) and possibly (54) can be disposed at a distance from the allocated partition lines (22), (24), (26), (28) and if necessary the longitudinal edge (52) such that a maximum resistance increase of 20% results. This ensures that the surface resistors (14) can be trimmed to the required extent.

The distance between the base lines (18) and (20), i.e. the active area of the thin-layer resistor (14), of which the change in the resistance value is used to determine the flow speed, can have a length of 7 mm. The width between the leading edge and the trailing edge can be 2 mm with a substrate thickness of 150 μm. In practice, the area between the base lines (18) and (20) and the side edges (30) and (32) is many times greater than shown in the drawing. In this way, the distance from the base line (18) or (20) and its allocated side edge (30) or (32) respectively can be 2.5 mm.

We claim:

1. In an anemometer for flow speed or mass flow measurement of gases or fluids comprising a surface resistor disposed on an electrically insulating carrier and having base lines separating adjacent areas of said surface resistor and extending in the direction of flow and first and second sets of partition lines separating adjacent areas of said surface resistor and extending substantially perpendicularly to said direction of flow from said base lines to form a current path consisting of current path sections outlined by said base lines and said partition lines, the widths of said current path sections being dimensioned such that the electrical heating capacity density in each current path section decreases at least largely in the same measure as the local heat current density dissipated by the flow speed or mass flow while the width of the current path sections increases in the direction of the flow, the improvement comprising;
    resistance trimming lines separating adjacent ares of said surface resistor, positioned parallel to said partition lines and extending from said base lines; said resistance trimming lines being so disposed that the effective resistance of each current path section having a resistance trimming line is increased in percentage to the same extent.

2. An anemometer as set forth in claim 1 in which there is a resistance trimming line for each partition line.

3. An anemometer as set forth in claim 1 in which said resistance trimming lines are in the upstream side of said surface resistor from the respective partition lines.

4. An anemometer as set forth in claim 1 in which the lengths of the resistance trimming lines is substantially the same as the lengths of the partition lines.

5. An anemometer as set forth in claim 1 in which the distance between the resistance trimming lines and the associated partition lines in such that the resistance value of the successive current path sections is increased by a maximum of 20%.

6. An anemometer as set forth in claim 1 in which the position of a resistance trimming line in relation to an associated partition line is such that the associated partition line is effectively widened.

7. An anemometer as set forth in claim 1 in which there is an additional resistance trimming line adjacent the downstream side of said surface resistor.

* * * * *